United States Patent
Kaplan (10) Patent No.: US 8,074,061 B2
(45) Date of Patent: Dec. 6, 2011

(54) EXECUTING MICRO-CODE INSTRUCTION WITH DELAY FIELD AND ADDRESS OF NEXT INSTRUCTION WHICH IS DECODED AFTER INDICATED DELAY

(75) Inventor: David A. Kaplan, Austin, TX (US)

(73) Assignee: Globalfoundries Inc.

( * ) Notice: Subject to any disclaimer, the term of this patent is extended or adjusted under 35 U.S.C. 154(b) by 174 days.

(21) Appl. No.: 12/253,339

(22) Filed: Oct. 17, 2008

(65) Prior Publication Data

US 2010/0100711 A1 Apr. 22, 2010

(51) Int. Cl.
*G06F 9/30* (2006.01)
(52) U.S. Cl. ............................... 712/245; 712/208
(58) Field of Classification Search ............... None
See application file for complete search history.

(56) References Cited

U.S. PATENT DOCUMENTS

| | | | | | |
|---|---|---|---|---|---|
| 4,447,873 | A | * | 5/1984 | Price et al. | 710/53 |
| 4,771,377 | A | * | 9/1988 | Wiser et al. | 713/600 |
| 2001/0027516 | A1 | * | 10/2001 | Kawarazaki | 712/245 |

* cited by examiner

*Primary Examiner* — Kenneth Kim (57) ABSTRACT

A microsequencer is disclosed that controls the order in which microcode instructions are fetched from a microcode ROM. Each microcode instruction includes an execution command for execution by one or more execution units. Each microcode instruction also includes a microsequencer command to indicate the location of another microcode instruction at the microcode ROM. The microcode instruction can also include a delay field, indicating a selectable time when the associated microcode instruction is to be decoded. The delay field thereby provides more flexible control of the sequencing of microcode instructions.

16 Claims, 4 Drawing Sheets

EXECUTING MICRO-CODE INSTRUCTION WITH DELAY FIELD AND ADDRESS OF NEXT INSTRUCTION WHICH IS DECODED AFTER INDICATED DELAY

BACKGROUND

1. Field of the Disclosure

The present disclosure relates generally to electronic devices, and more particularly to data processor devices.

2. Description of the Related Art

A complex instruction set computer (CISC) device typically executes assigned tasks by decoding a set of complex instructions associated with the task. In particular, the CISC device decodes each complex instruction into a series of smaller instructions, referred to as microcode instructions. A microcode instruction is typically configured for execution by one or more execution units of the data processor device. The series of microcode instructions associated with each complex instruction are typically stored in a read only memory (ROM). A microsequencer device determines the order in which the series of microcode instructions are fetched from the microcode ROM, decoded, and subsequently executed.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A microsequencer is disclosed that controls the order in which microcode instructions are fetched from a microcode ROM. Each microcode instruction includes an execution command for execution by one or more execution units. Each microcode instruction also includes a microsequencer command to indicate the location of another microcode instruction at the microcode ROM. The microcode instruction can also include a microsequencer pipeline delay value, indicating when the associated microcode microsequencer command is to be decoded. The delay value thereby provides more flexible control of the sequencing of microcode instructions.

Figure 1:
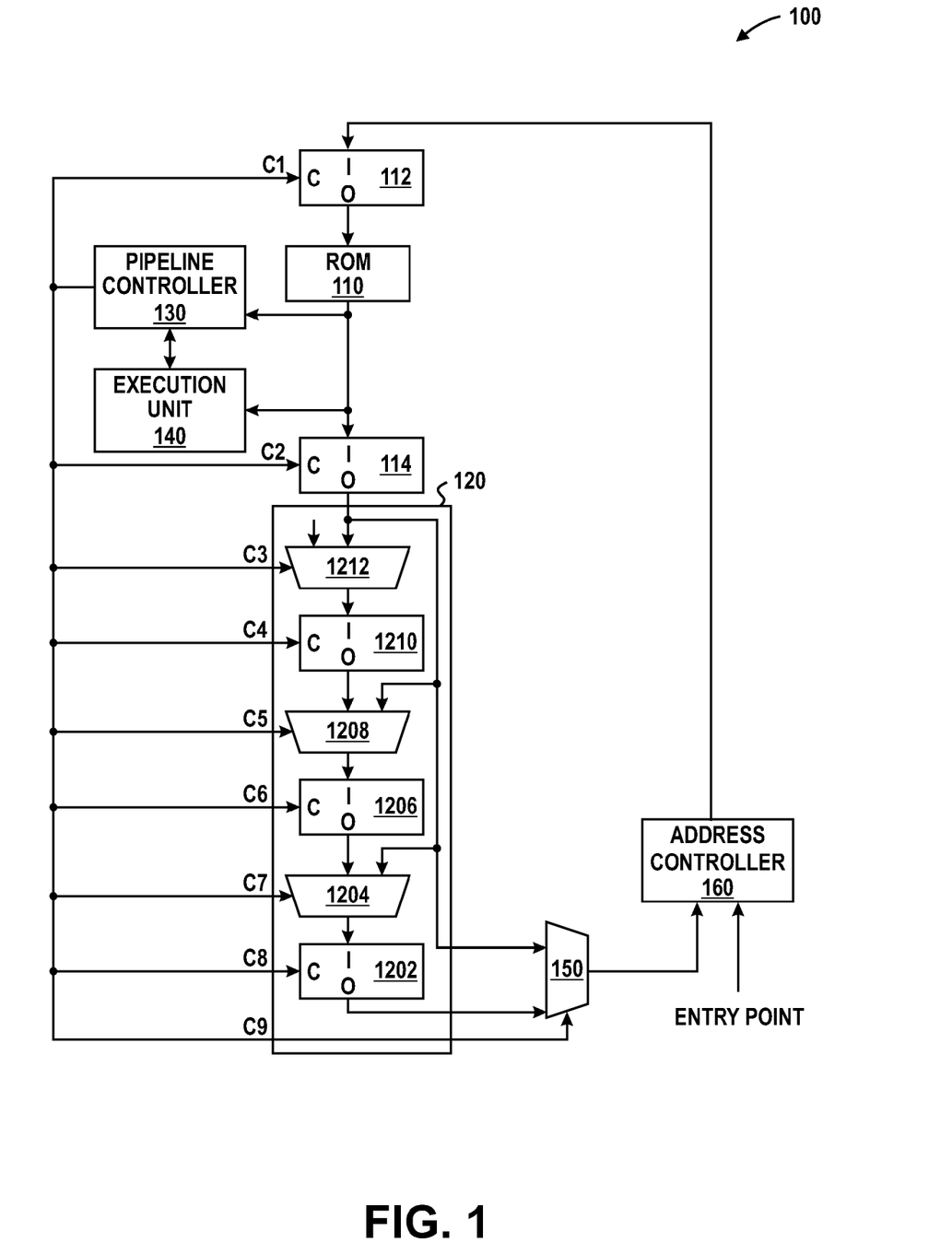
FIG. 1 includes a block diagram illustrating a microsequencer in accordance with a specific embodiment of the present disclosure.

FIG. 1 includes a block diagram illustrating a microsequencer 100 in accordance with a specific embodiment of the present disclosure. Microsequencer 100 includes a ROM 110, a ROM address latch 112, a ROM data latch 114, a microsequence command pipeline 120, a pipeline controller 130, an execution unit 140, a multiplexor 150, and an address controller 160. Microsequence command pipeline 120 further includes a delay register 1202, a multiplexor 1204, a delay register 1206, a multiplexor 1208, a delay register 1210, and a multiplexor 1212.

ROM 110 has an input and an output. ROM data register 114 has a first input connected to the output of ROM 110, a control input to receive a control signal labeled "C2," and an output. Multiplexor 1212 has a first input connected to the output of ROM data register 114, a second input (connection not shown), a control input to receive a control signal labeled "C3," and an output. Delay register 1210 has an input connected to the output of multiplexor 1212, a control input to receive a control signal labeled "C4," and an output. Multiplexor 1208 has a first input also connected to the output of ROM data register 114, a second input connected to the output of delay register 1210, a control input to receive a control signal labeled "C5," and an output. Delay register 1206 has an input connected to the output of multiplexor 1208, a control input to receive a control signal labeled "C6," and an output. Multiplexor 1204 has a first input also connected to the output of ROM data register 114, a second input connected to the output of delay register 1206, a control input to receive a control signal labeled "C7," and an output. Delay register 1202 has an input connected to the output of multiplexor 1204, a control input to receive a control signal labeled "C8," and an output.

Multiplexor 150 has a first input also connected to the output of ROM data register 114, a second input connected to the output of delay register 1202, a control input to receive a control signal labeled "C9," and an output. Address controller 160 has an input connected to the output of multiplexor 150, another input to receive a signal labeled "ENTRY POINT," and an output. ROM data register 112 has an input connected to the output of address controller 160, a control input to receive a control signal labeled "C1," and an output connected to the input of ROM 110.

Pipeline controller 130 has an input also connected to the output of ROM 110, an input/output, and nine outputs that provide control signals C1 through C9. Execution unit 140 has an input also connected to the output of ROM 110, and an input/output connected to the input/output of pipeline controller 130.

Figure 2:
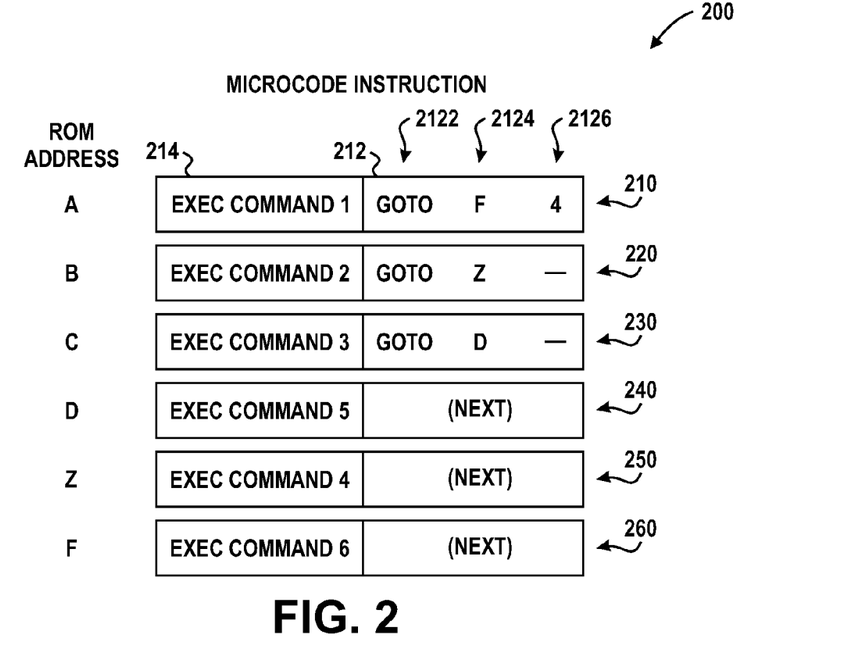
FIG. 2 includes a table illustrating a portion of microcode stored at the microcode ROM of FIG. 1 in accordance with a specific embodiment of the present disclosure.

ROM 110 stores a set of microcode instructions. In particular, ROM 110 includes a number of memory locations, whereby each memory location is associated with an address. Each memory location stores a microcode instruction. An example set of microcode instructions 200 corresponding to a single CISC instruction is illustrated at FIG. 2. In particular, microcode program 200 includes a microcode instruction 210 stored at an address of ROM 110 labeled "A." Microcode instruction 210 includes an execution command portion 214 configured to control operation of execution unit 140 of microsequencer 100. Microcode instruction 210 also includes a microsequencer command portion 212 to indicate another microcode instruction stored at ROM 110. In the illustrated example, microsequencer command 212 further includes a microsequencer operation field 2122, an operation destination field 2124, and a microsequencer pipeline delay field 2126. Microsequencer operation field 2122 indicates a particular microsequencer operation to be executed. The operation destination field 2124 indicates a ROM address associated with the microsequencer operation, and delay field 2126 indicates a time when the microsequencer operation is to be decoded, as described further herein.

Referring again to FIG. 1, ROM 110 is configured to receive a memory address identifying a memory location. In response, ROM 110 provides the microcode instruction stored at the memory location at its output. An initial address provided to ROM 110 corresponds to the first location in the series of microcode instruction that implements a particular CISC instruction. A CISC instruction decoder (not shown) provides the initial microcode address to address controller 160 via signal ENTRY POINT. Subsequent ROM addresses are determined by the individual microcode microsequencer commands until all of the microcode instructions corresponding to the CISC instruction have been executed. Another entry point address can then be provided to address controller 160 corresponding to the next CISC instruction.

Address controller 160 is configured to receive a microsequencer command 212 at its input and, and based on the microsequencer command, provide a ROM 110 address at the output. For example, in response to a microsequencer command indicating a branch operation (e.g. a GOTO command), the address controller 160 can calculate the address indicated by the command. In response to the microsequencer command not indicating a branch operation, address controller 160 can increment or otherwise adjust a previously determined address. Accordingly, in response to receiving a sequence of microsequencer commands that do not indicate a branch operation, the address controller can provide a series of contiguous memory addresses.

Execution unit 140 is configured to receive an execution unit command and control the dispatch, execution and retirement of the execution unit command. Accordingly, the execution unit 140 can be configured to execute arithmetic operations, load/store operations, and the like, to execute one or more operations associated with the received execution unit command.

The multiplexors 1204, 1208, and 1212 of the microsequence command pipeline 120 are each configured to provide information at one of its inputs to its output based upon the state of a corresponding control signal C3, C5, and C7. For example, multiplexor 1204 is configured to select between information provided at its inputs to the output based on control signal C7. Delay registers 1202, 1206, and 1210 are each configured to provide information received at a corresponding input to its output in response to assertion of the associated control signal C4, C6, and C8. In an embodiment, each of delay registers 1202, 1206, and 1210 is a latch device.

Pipeline controller 130 is configured to receive a microcode sequencer command to control assertion and negation of control signals C1-C9 to control the source of the microsequencer command provided to address controller 160. To illustrate, for purposes of discussion it is assumed that microsequencer 100 operates according to a series of machine cycles. The machine cycle during which a microcode instruction is retrieved from ROM 110 will be referred to as the "fetch" stage for that instruction. The machine cycle during which the microsequencer command is decoded at address controller 160 is referred to as the "decode" cycle. It will be appreciated that, in a pipelined fashion, the fetch cycle for a particular instruction can overlap with the decode cycle for a previously fetched instruction. Thus, while one microcode instruction is being executed, another microcode instruction can be decoded, and yet another microcode instruction can be fetched. In addition, it will be appreciated that the fetch cycle and the decode cycle for a particular microcode instruction may not correspond to immediately successive clock cycles of microsequencer 100. For example, for a variety of reasons, the microsequencer 100 can be stalled, so that an instruction will not progress immediately from one stage to another, and a new microcode instruction may not be fetched in a particular machine clock cycle.

In operation, microsequence command pipeline 120 can receive a microsequencer commands from ROM data latch 114 and can delay providing the command to address controller 160 for a number of machine cycles based on the value specified at pipeline delay field 2126 associated with microsequencer command 212. For example, control signal C7 can configure multiplexor 1204 to select the microsequencer command provided by ROM data latch 114. The microsequencer command is received at delay register 1202 in response to control signal C8, and subsequently delayed for one or more machine cycles. Multiple microsequencer commands can be delayed in a similar manner by asserting control signals C3 through C8 to configure multiplexors 1212, 1208, and 1204, and delay registers 1210, 1206, and 1202, of command pipeline 120. Additional or fewer multiplexor/delay register stages can be included to support a greater or lesser number of parallel delay operations. This operation can be better understood with reference to FIGS. 2 and 3.

FIG. 2 includes a table illustrating a portion of a microcode program 200 in accordance with a specific embodiment of the present disclosure. Microcode program 200 includes microcode instruction 210 stored at a ROM address labeled "A," microcode instruction 220 at a ROM address labeled "B," microcode instruction 230 stored at a ROM address labeled "C," microcode instruction 240 stored at a ROM address labeled "D," microcode instruction 250 stored at a ROM address labeled "Z," and microcode instruction 260 stored at a ROM address labeled "F." Microcode instruction 210 includes execution unit command 214 and microsequencer command 212. Microsequencer command 212 further includes microsequencer operation 2122, operation destination 2124, and microsequencer pipeline delay value 2126.

Microcode instruction 210 includes an execution unit command labeled "EXEC COMMAND1," and a microsequencer command labeled "GOTO F in 4." This microsequencer command is a branch operation that commands the microsequencer to fetch a microcode instruction from ROM address F, but to delay decoding that branch instruction for four decode cycles. Because the decode of the GOTO F branch command is delayed, address controller 160 increments the ROM fetch address from address A to address B, and microcode instruction 220 will be fetched in the next cycle. Microcode instruction 220 includes an execution unit command labeled "EXEC COMMAND2," and a microsequencer command labeled "GOTO Z," and no pipeline delay is indicated. The microsequencer command therefore proceeds directly from a fetch stage into a decode stage. Microcode instruction 230 is a delayed branch instruction that follows microcode instruction 220, and address controller 160 increments the ROM fetch address to fetch microcode instruction 230.

Microcode instruction 230 includes an execution unit command labeled "EXEC COMMAND3," and a microsequencer command labeled "GOTO D," and no pipeline delay is indicated. The microsequencer command therefore proceeds directly from a fetch stage into a decode stage. Microcode instruction 240 includes an execution unit command labeled "EXEC COMMAND5," and does not include a microsequencer command. Because there is no microsequencer command specified, address controller 160 increments the previous ROM address and thus fetches a microcode instruction immediately following the previously fetched instruction. Microcode instruction 250 includes an execution unit command labeled "EXEC COMMAND4," and does not include a microsequencer command. Because there is no microsequencer command specified, address controller 160 increments the previous ROM address. Microcode instruction 260 includes an execution unit command labeled "EXEC COMMAND6," and does not include a microsequencer command.

Because there is no microsequencer command specified, address controller 160 increments the previous ROM address.

Microcode program 200 can represent a portion of microcode program that implements a CISC instruction. The series of execution unit commands configure devices at execution unit 140 to perform the micro-operations that, together, completes execution of the CISC instruction. The microsequencer command associated with each execution unit command determines which microcode instruction, and thus which execution command, is the next to be fetched.

Figure 3:
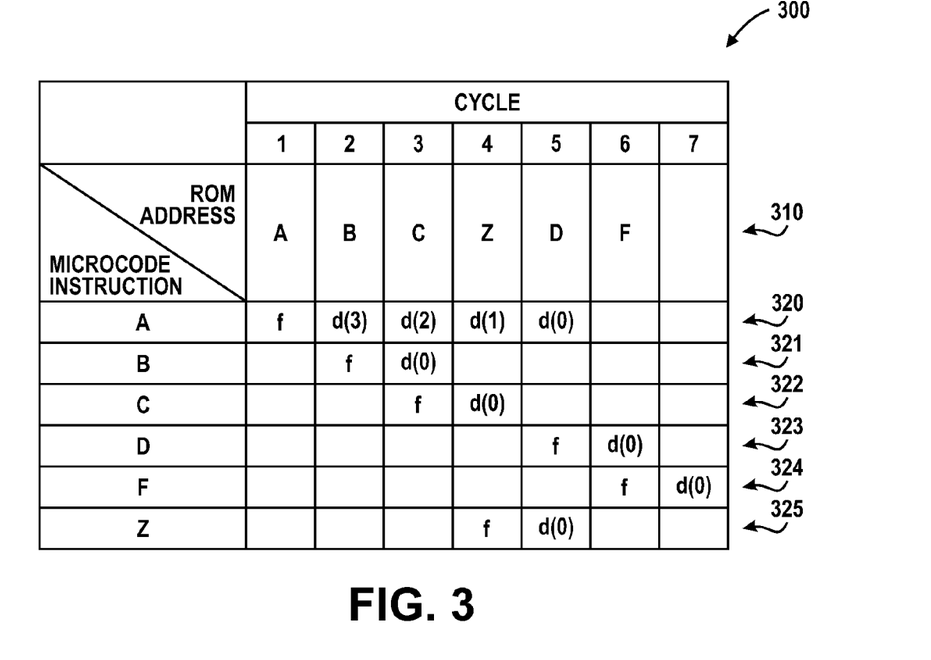
FIG. 3 includes a table illustrating a pipeline execution of the microcode of FIG. 2 in accordance with a specific embodiment of the present disclosure.

FIG. 3 includes a table 300 illustrating a pipeline execution of the microcode program of FIG. 2 in accordance with a specific embodiment of the present disclosure. In particular, table 300 illustrates the timing of the fetch and decode cycles for the microcode program of FIG. 2. During the decode cycle, the microsequencer command is decoded to determine what kind of microsequencer operation should be performed. Once the microsequencer operation is determined, the operation can be performed in a subsequent machine cycle. For the purpose of this example, the term 'cycle' is used to describe successive ROM fetch cycles. Due to microsequencer stalls, these cycles may not correspond to immediately successive clock cycles. The horizontal axis of table 300, from left to right, specifies ROM fetch cycles, labeled 1 through 7.

Row 310 indicates the ROM address that is provided by address controller 160, and thus the ROM address that will be fetched in that cycle. In cycle 1, a microcode instruction at ROM address A is fetched. In cycle 2, a microcode instruction at ROM address B is fetched. In cycle 3, a microcode instruction at ROM address C is fetched. In cycle 4, a microcode instruction at ROM address Z is fetched. In cycle 5, a microcode instruction at ROM address D is fetched. In cycle 6, a microcode instruction at ROM address F is fetched.

Row 320 illustrates the progress of the microcode instruction located at ROM address A after the instruction is fetched in cycle 1. The microcode instruction includes the microsequencer command GOTO F in 4. Because a decode delay of four is specified, the GOTO F microsequencer command does not proceed to the decode stage in the next cycle. Instead, the GOTO F command is provided to decode pipeline 120. After 4 cycles, microsequence command pipeline 120 provides the instruction to address controller 160, via multiplexor 150, to be decoded. Address controller 160 decodes the GOTO F microsequencer command and thus provides ROM 110 with address F to be fetched in cycle 6. During cycles 2-5, the delay count of 4 is decremented from d(3) in cycle 2, to d(2) in cycle 3, to d(1) in cycle 4, and to d(0) in cycle 5. During cycle 5, the microsequencer command GOTO F is provided to address controller 160 for decode by configuring multiplexor 150 to select the delayed command from delay register 1202 instead of the NEXT microsequencer command associated with the microcode instruction located at ROM address Z. Even though the decode of the GOTO F microsequencer command was delayed, the execution unit command, EXEC COMMAND1, located at ROM address A is decoded in cycle 2 and can begin execution in cycle 3.

Row 321 illustrates the microcode instruction located at ROM address B progressing from fetch in cycle 2 to decode in cycle 3. The microcode instruction located at ROM address B includes the microsequencer command GOTO Z. Because no decode pipeline delay is specified, the command proceeds directly from fetch in cycle 2 into decode in cycle 3. Multiplexor 150 selects ROM data latch 114, and the GOTO Z instruction is decoded by address controller 160 during cycle 3, and the destination address Z is fetched in cycle 4. Execution unit command, EXEC COMMAND2, is also decoded in cycle 3, and can proceed to the execution unit in cycle 4.

Row 322 illustrates the microcode instruction located at ROM address C progressing from fetch in cycle 3 and to decode in cycle 4. Row 323 illustrates the microcode instruction located at ROM address D progressing from fetch in cycle 5 and to decode in cycle 6. Row 324 illustrates the microcode instruction located at ROM address F progressing from fetch in cycle 6 and to decode in cycle 7. Row 325 illustrates the microcode instruction located at ROM address Z progressing from fetch in cycle 4 and to decode in cycle 5. The microsequencer command associated with the microcode instruction located at ROM address Z is not decoded during cycle 5, since the microsequencer command associated with the microcode instruction at ROM address A is instead selected by multiplexor 150.

In the illustrated example of FIG. 3, the use of microsequence command pipeline 120 enables the microcode programmer to place the GOTO F command at an earlier location in ROM 110, which permitted the branch delay slot for the subsequent two GOTO commands to include useful commands. In a conventional system, without the use of microsequence command pipeline 120, the branch delay slot for the GOTO F command would likely have been filled with a null-operation command, which performs no useful function. Thus, the illustrated microcode program requires one less cycle to execute, thereby increasing the computational performance of the computer when executing the corresponding CISC instruction. Because the null-operation command is not required, ROM data space is also saved, which can either save silicon die area, or can be used to implement additional CISC instructions.

Figure 4:
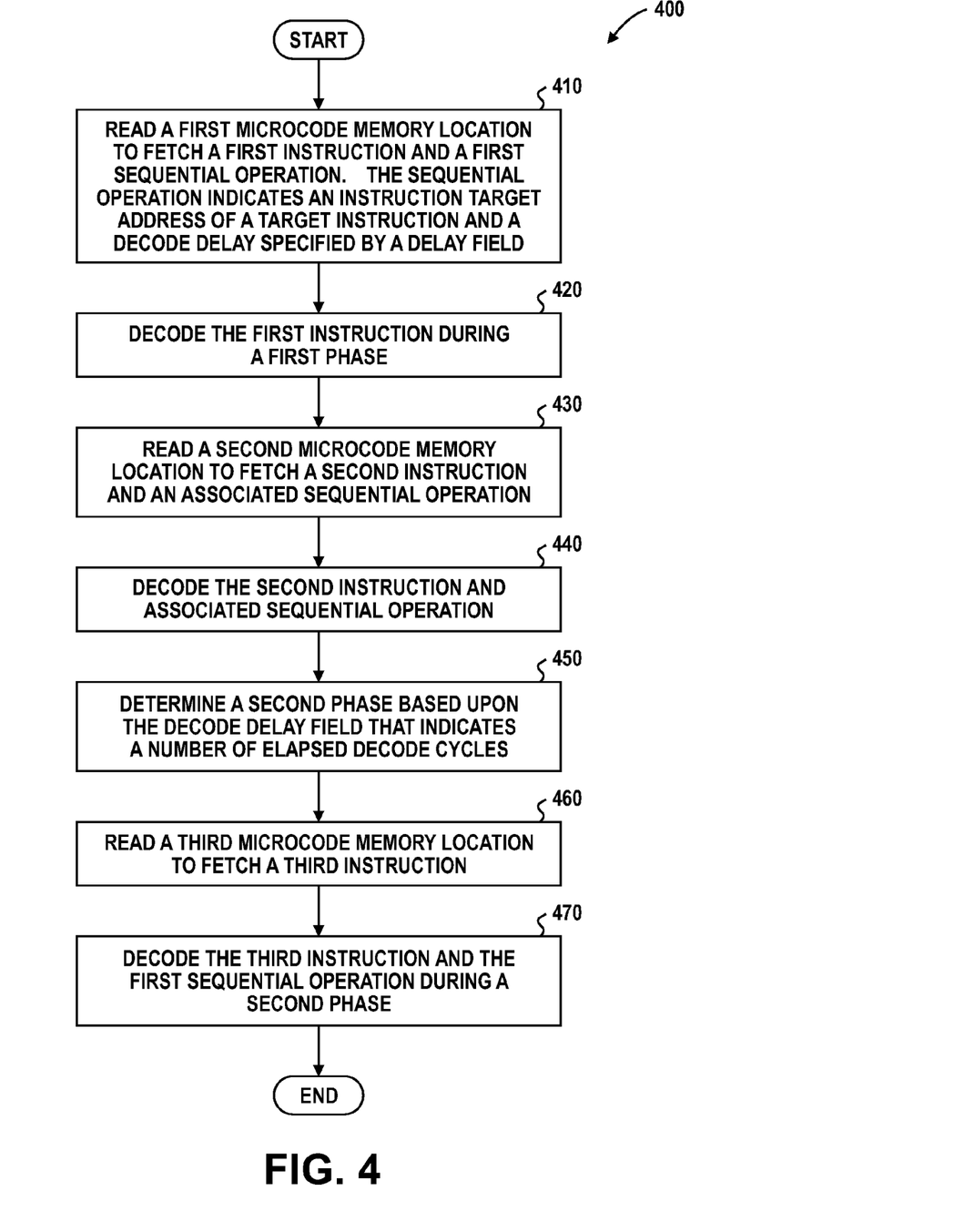
FIG. 4 includes a flow diagram illustrating operation of the microsequencer of FIG. 1 in accordance with a specific embodiment of the present disclosure.

FIG. 4 includes a flow diagram 400 illustrating operation of microsequencer 100 of FIG. 1 in accordance with a specific embodiment of the present disclosure. A portion of the microcode program illustrated at FIGS. 2 and 3 is used to illustrates how the execution unit command and the microsequencer command of a specific microcode instruction can be decoded at different times.

At block 410, a first microcode memory location A is read from ROM 110 to fetch a first instruction EXEC COMMAND1, and a first sequential operation GOTO F 4. The sequential operation indicates an instruction target address F of a target instruction EXEC COMMAND6, and a decode delay of 4 cycles specified by a delay field. At block 420, the first instruction EXEC COMMAND1 is decoded during a first phase (cycle 2 at FIG. 3). At block 430, a second microcode memory location B is read to fetch a second instruction EXEC COMMAND2, and an associated sequential operation GOTO Z. At block 440, the second instruction and associated sequential operation are decoded (cycle 3 at FIG. 3). At block 450, a second phase is determined based upon the decode delay field that indicates a number of elapsed decode cycles. At block 460, a third microcode memory location Z is read to fetch a third instruction EXEC COMMAND4. At block 470, the third instruction and the first sequential operation are decoded during a second phase (cycle 5 at FIG. 3).

Figure 5:
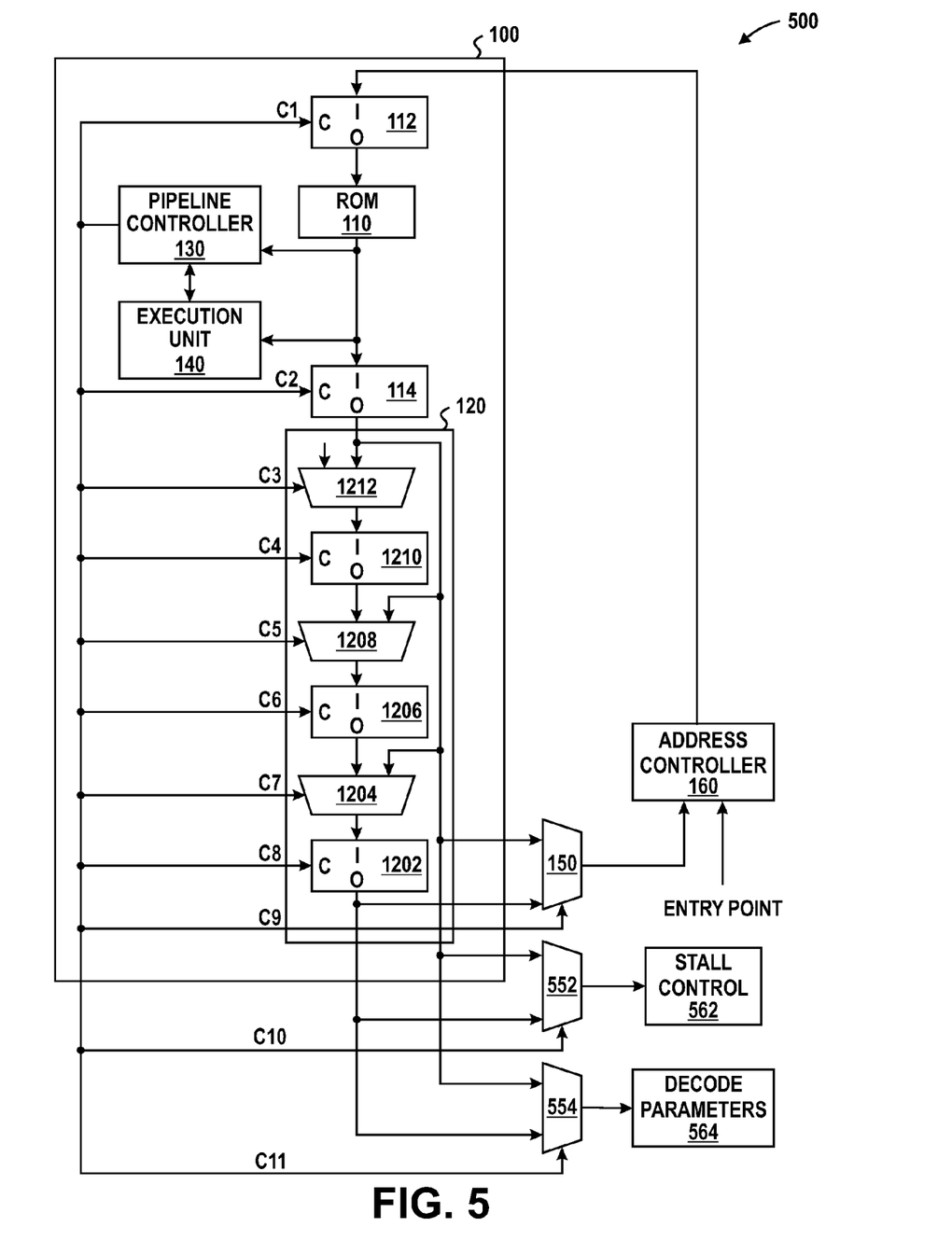
FIG. 5 includes a block diagram illustrating a microsequencer in accordance with another specific embodiment of the present disclosure.

FIG. 5 includes a block diagram illustrating microsequencer 500 in accordance with another specific embodiment of the present disclosure. Microsequencer 500 includes microsequencer 100 of FIG. 1, multiplexor 552, stall control module 562, multiplexor 554, and decode parameters module 564. Multiplexor 552 has a first input connected to the output of ROM data latch 114, a second input connected to the output of delay register 1202, and an output. Stall control module 562 has an input connected to the output of multiplexor 552. Multiplexor 554 has a first input connected to the output of ROM data latch 114, a second input connected to the output of delay register 1202, and an output. Decode parameter module 564 has an input connected to multiplexor 554.

Microsequencer decode units 562 and 564 allow microsequencer command 212 of microcode instruction 210 to be used for functions other than branching. For example, microcode instruction 240 at FIG. 2 does not include a branch type microsequencer command because address controller 160 is incrementing the previous ROM fetch address to fetch the next microcode instruction 250. Microsequencer command 212 can therefore be used to provide commands to microsequencer decode units 562 or 564. Furthermore, stall control 562 or decode parameter module 564 can decode a special microsequencer command at the same time that address controller 160 is decoding a ROM fetch command.

Stall control module 562 is responsive to a "serialize" microsequencer command configured to stall microsequencer 500. To illustrate, execution unit 140 includes scheduling and dependency hardware that is usually able to stall microsequencer when execution unit 140 is not able to receive a new execution command. In such a case, execution unit 140 can provide control 130 with a momentary stall request. The serialize command is used to stall the microsequencer for conditions that scheduling hardware is unable to identify. The microsequencer remains stalled until pipeline controller 130 receives an indication from execution unit 140 that microsequencer operation can resume.

Decode parameter module 564 is responsive to specific microsequencer commands that can be used to modify a parameter, such as a state variable in a selected portion of the microsequencer and associated execution units. For example, a "force opsize" command can be used to modify a parameter at a configuration register or modify a parameter stored as an internal variable so that subsequent execution unit command operands are interpreted as doubleword operands. Decode parameter module 564 can perform operations without a corresponding increase in ROM capacity by making use of otherwise unused microcode instruction fields.

This can be better understood with reference to an example. In the example, a first microcode instruction located at ROM address A includes a microsequencer command (referred to herein as MS Command A) for decoding at the decode parameter module 564. In addition, the first microcode instruction includes a pipeline delay field indicating that MS Command A should not be decoded for 1 cycle. The next microcode instruction, located at ROM address B, includes a microsequencer command (referred to herein as MS Command B) for decoding at the address controller 160. In addition, the next microcode instruction does not include a value at the associated pipeline delay field, indicating no delay for the decoding of MS Command B.

Accordingly, during operation, the first microcode instruction is fetched from ROM Address A during a first machine cycle. In addition, pipeline controller 130 analyzes the associated pipeline delay field and, based on the field, stores MS Command A at delay register 1206.

During the next machine cycle, the instruction at ROM Address B is fetched based on the address provided by the address controller 160. MS Command A is communicated to register 1208, and MS Command B is stored at register 114.

During the following machine cycle (the third machine cycle in the sequence), MS Command A is decoded at the decode parameters module 564. During the same cycle, MS Command B is decoded at address controller 160. Thus, as illustrated by this example, the pipeline delay field allows different microsequencer commands to be decoded during the same machine cycle, allowing for more flexible programming of the microsequencer 500.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, a microcode instruction, such as microcode instruction 210 at FIG. 2, illustrated a single execution unit command 214, but scheduling and data dependency hardware can support two or more execution commands at each microcode instruction. Execution unit 140 can include multiple execution units, under the control of an appropriate scheduling device.

Three delay stages are illustrated at microsequence command pipeline 120, which permit three simultaneously outstanding delayed microsequencer operations. A fewer or greater number of stages can be incorporated based upon the requirements of a particular computer hardware architecture and set of supported CISC instructions. Microsequence command pipeline 120 is illustrated as a shift register, but can also be implemented as individual registers, each capable of providing a stored command directly to multiplexor 150 based upon control signals provided by pipeline controller 130.

Microcode instruction 210 includes a microsequencer command labeled "GOTO F in 4, where the delay parameter "4" can indicate a number of decode cycles to elapse before decoding the microsequencer command. It will be appreciated that the delay parameter can also correspond to a number of events, such as the assertion of a particular signal by execution unit 140.

Microsequencers 100 and 500 include a specific implementation of clock and control signals, but skilled artisans will appreciate that factors unique to a particular design implementation will influence available choices of clock, control, and design partition.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    reading a first memory location, the first memory location comprising a first instruction, a first sequence operation, and a delay, the first sequence operation indicative of a second memory location comprising a second instruction and a second sequence operation, the first and second instructions based on a first complex instruction;
    decoding the first instruction during a first phase;
    scheduling a second phase based on the delay, the second phase after the first phase; and
    decoding the first sequence operation during the second phase.

2. The method of claim 1, wherein decoding the first sequence operation comprises determining an operation parameter for a decode unit based on the first sequence operation.

3. The method of claim 1, wherein the delay of the first memory location indicates a number of cycles to delay decode of the first sequence operation.

4. The method of claim 1, wherein the delay of the first memory location indicates a number of events.

5. The method of claim 1, further comprising:
reading a third memory location of the memory, the third memory location comprising a third instruction; and
decoding the third instruction during the second phase.

6. The method of claim 5, wherein the third memory location comprises a third sequence operation, and further comprising decoding the third sequence operation during the second phase.

7. The method of claim 1, wherein the first memory location further comprises a third instruction based on the first complex instruction, and further comprising decoding the third instruction during the first phase.

8. The method of claim 1, further comprising:
reading a third memory location, the third memory location comprising a third instruction and a third sequence operation, the third instruction based on the first complex instruction;
decoding the third instruction during a third phase; and
decoding the third sequence operation during the third phase.

9. The method of claim 8, wherein the third phase is after the first phase and prior to the second phase.

10. The method of claim 1, wherein decoding the first sequence operation comprises determining the second memory location based on the first sequence operation.

11. The method of claim 1, wherein decoding the first sequence operation comprises determining a stall condition of an instruction pipeline based on the first sequence operation.

12. A method, comprising:
reading a first memory location, the first memory location comprising a first instruction and a first sequence operation, the first sequence operation indicative of a second memory location comprising a second instruction and a second sequence operation, the first and second instructions based on a first complex instruction;
scheduling a first phase based on a value at a delay field associated with the first sequence operation; and
decoding the first sequence operation during the first phase.

13. The method of claim 12, further comprising:
decoding the first instruction during a second phase, the second phase prior to the first phase.

14. The method of claim 12, further comprising:
reading a third memory location, the third memory location comprising a third instruction, the third instruction based on the first complex instruction; and
decoding the third instruction during a third phase, the third phase prior to the first phase and after the second phase.

15. The method of claim 12, further comprising:
reading a third memory location, the third memory location comprising a third instruction, the third instruction based on the first complex instruction; and
decoding the third instruction during the first phase.

16. The method of claim 12 wherein decoding the first sequence operation comprises determining the second memory location based on the first sequence operation.

* * * * *

UNITED STATES PATENT AND TRADEMARK OFFICE
CERTIFICATE OF CORRECTION

PATENT NO. : 8,074,061 B2
APPLICATION NO. : 12/253339
DATED : December 6, 2011
INVENTOR(S) : David A. Kaplan It is certified that error appears in the above-identified patent and that said Letters Patent is hereby corrected as shown below:

Column 10, Line 18, please change "claim 12," to --claim 13,--

Signed and Sealed this
Thirteenth Day of March, 2012

David J. Kappos
*Director of the United States Patent and Trademark Office*